United States Patent

[11] 3,609,512

| [72] | Inventor | Edward E. Lewis |
| | | Hillsborough, Calif. |
| [21] | Appl. No. | 774,250 |
| [22] | Filed | Nov. 8, 1968 |
| [45] | Patented | Sept. 28, 1971 |
| [73] | Assignee | Leach Corporation |
| | | South Pasadena, Calif. |

[54] APPARATUS FOR CONTROLLING POWER TO A LOAD BY SENSING OVERLOAD CONDITIONS
16 Claims, 3 Drawing Figs.

| [52] | U.S. Cl. | 323/9, 323/20, 323/22 T, 323/38 |
| [51] | Int. Cl. | G05f 1/58 |
| [50] | Field of Search | 317/22, 31, 33, 36 TO; 323/9, 16, 19, 20, 22 T, 30, 38, 89 C, 89 (.12) |

[56] References Cited
UNITED STATES PATENTS

| 3,373,341 | 3/1968 | Wattson | 323/9 |
| 3,445,751 | 5/1969 | Easter | 323/9 |
| 2,774,930 | 12/1956 | Bixby | 323/89 X |
| 3,207,975 | 9/1965 | Pintell | 323/89 X |
| 3,354,378 | 11/1967 | Jewett | 323/22 X |

Primary Examiner—J. D. Miller
Assistant Examiner—A. D. Pellinen
Attorney—Christie, Parker & Hale ABSTRACT: A power controller circuit for switching current on and off through a load. The controller includes a magnetic amplifier for sensing overload conditions and limiting current through a power transistor switch. A timeout circuit including a second magnetic amplifier turns off the controller after a predetermined time of operation under overload conditions. The current through the load is controlled by a bias winding on the magnetic amplifier controlled in response to the voltage across the load such that the average current under short circuit load conditions is substantially reduced over normal overload conditions.

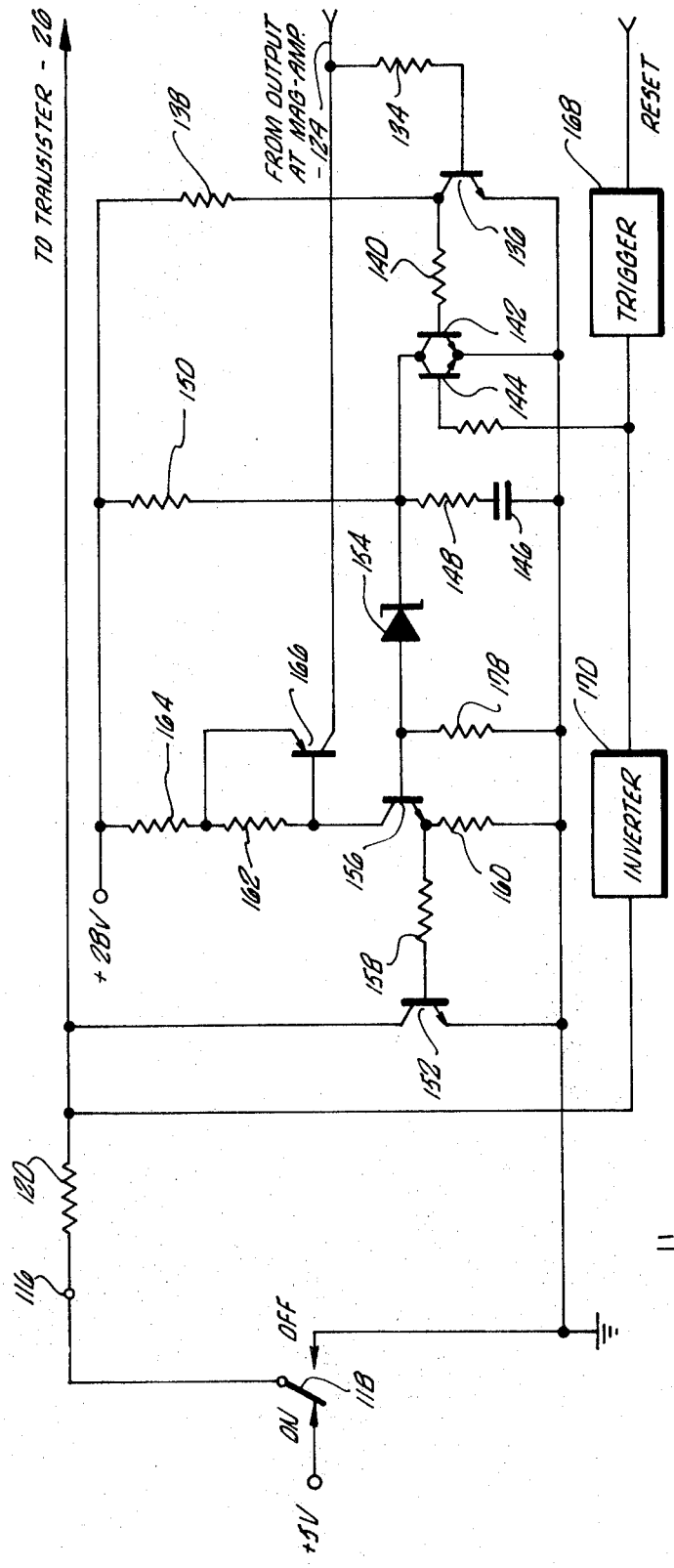

APPARATUS FOR CONTROLLING POWER TO A LOAD BY SENSING OVERLOAD CONDITIONS

BACKGROUND OF THE INVENTION

Aircraft electrical systems usually operate at 28 volts DC Because of the low voltage, relatively high current requirements are encountered. Remote switching of large loads has generally been handled by mechanical relays, necessitating relay logic to control the circuits. Circuit breakers are required to protect against overload conditions, usually a circuit breaker being required for each separate load to prevent any major loss of power throughout the aircraft. The ability to reset any one of a large number of circuit breakers scattered throughout the aircraft becomes a problem. It is therefore desirable to have a power controller for each load which combines the function of a switch circuit breaker and current limiter and which can be controlled remotely from low-level signals.

SUMMARY OF THE PRESENT INVENTION

The present invention is directed to a self-contained power controller utilizing solid state devices to switch the power to the load. The power controller is operated from a low-level signal so that low-level logic may be used in the associated control circuitry. The power controller, in addition to providing the switching function, includes its own overload protection. The power controller can be reset either by turning off the power controller in the normal manner or by applying a low-level resetting signal to the power controller. A timeout circuit automatically turns off the power controller after a short interval of operation under an overload condition.

Further advantages of the circuit of the present invention are that although transistor switching is used, the output of the power controller can be floating with respect to ground potential, so that the switching operation can be performed at the high-voltage side of the load. In addition, the circuit operates without generation of any R-F noise commonly encountered in any high-speed switching devices.

In brief, the power controller circuit of the present invention comprises a power transistor having its emitter and collector series connected with a load across a DC source. The base current to turn on the power transistor is provided by a rectifier operating from an AC source, so that the power transistor can be floating with respect to DC ground. A magnetic amplifier operated from the same AC source is controlled by a first bias winding connected in series with the load. The bias winding turns on the magnetic amplifier when the load current reaches a predetermined level. The magnetic amplifier turns on a shunt transistor connected between the base and emitter of the power transistor to bypass the base current and thereby turn off the power transistor. A second bias winding on the magnetic amplifier is connected across the load so as to control the load current level at which the magnetic amplifier turns on, depending on the voltage drop across the load. For a short circuit, with substantially no voltage drop across the load, the magnetic amplifier is turned on when the load current is well below the rated level. A second magnetic amplifier senses an overload condition and initiates a timing circuit to turn off the AC source and thereby turn off the power controller after a predetermined time interval. The timing circuit can be reset remotely to permit the power controller to be reactivated.

DESCRIPTION OF THE DRAWINGS

For a more complete understanding of the invention, reference should be made to the accompanying drawings, wherein:

FIG. 2 is a circuit diagram of the timing control and resetting portion of the power controller circuit; and FIG. 3 is a graphical illustration of the overload characteristics of the power controller.

DETAILED DESCRIPTION OF THE INVENTION

Figure 1:
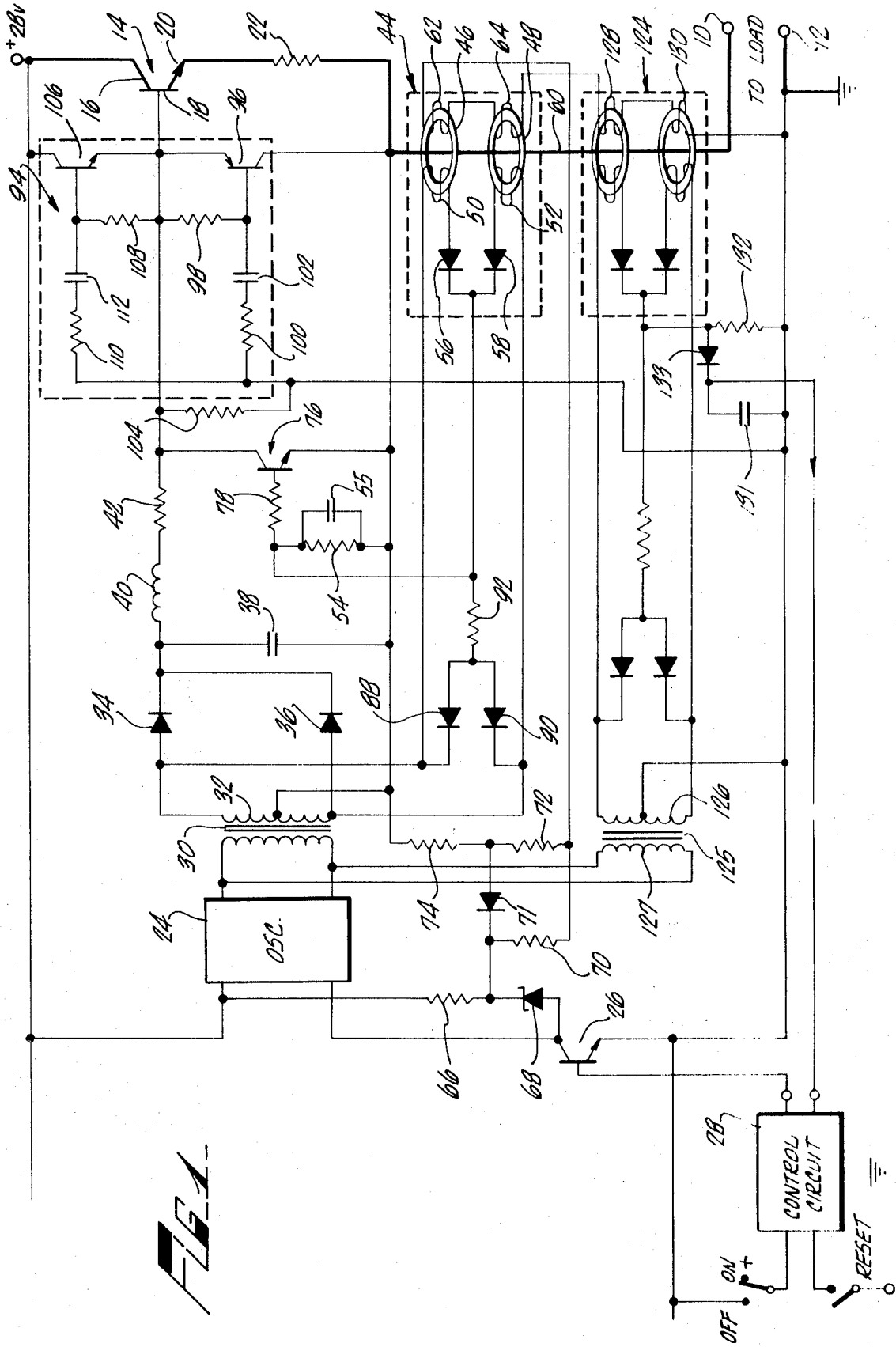
FIG. 1 is a circuit diagram of the switching and overload portion of the power controller.

Referring to FIG. 1 in detail, the power controller circuit is provided with a pair of output terminals 10 and 12 across which an electrical load is adopted to be connected. One terminal 12 is preferably connected to the ground terminal of a 28-volt DC power source (not shown). The other terminal 10, in turn, is connected to the positive terminal of the power source through a power transistor indicated generally at 14. Power transistor 14 includes a collector electrode 16, a base electrode 18, and an emitter electrode 20. The collector electrode 16 and the emitter electrode 20 are series connected between the load and the potential source. A resistor 22 may be connected in series with the emitter 20 to provide some degeneration and prevent the transistor 14 from going into or staying in saturation when the load is a dead short. The resistor 22 is quite small, providing only a tenth of a volt drop or less at 100 percent of the rated current of the power controller.

Base current to turn on the power transistor 14 is derived from an inverter circuit which includes an oscillator 24 whose input is connected across the 28-volt DC source through the emitter collector circuit of a transistor 26. The transistor 26 is operated by a control circuit 28, hereinafter described in detail in connection with FIG. 2. The output of the oscillator 24 is coupled to a full-wave rectifier circuit by a transformer 30 having a center-tapped secondary winding 32. Opposite ends of the winding 32 are connected through diodes 34 and 36 to the base electrode 18 of the power transistor 14 while the center tap of the secondary winding 32 is connected to the emitter electrode 20 of the transistor 14. The output of the rectifier circuit is filtered by a suitable low-pass filter including a bypass capacitor 38 and choke 40. Maximum base current is limited by a resistor 42 in series with the base electrode 18. Thus, when the control circuit 28 turns on the transistor 26, turning on the oscillator 24, the rectifier circuit provides current to the base electrode 18, turning on the power transistor 14. Because of the AC coupling of the transformer 30, the transistor 14 may be floating with respect to the grounded terminal of the 28-volt power source.

To protect the load and to protect the power transistor 14 from overheating and possible failure due to an overload condition, the power controller circuit includes means for limiting the average current to the load. The overload control must be able to accommodate overloads up to 150 percent of rated current of the power controller to accommodate the initial current surge to loads such as electric motors and electric lights. The control circuit must be further able to accommodate the condition of a dead short in which substantially all the voltage drop is across the transistor 14. In the event of a dead short, the current through the transistor 14 must be limited to well below the rated current to prevent overheating and destruction of the power transistor 14.

This current limiting control is achieved in the power controller of the present invention by means of a magnetic amplifier, indicated generally at 44. The magnetic amplifier circuit is a conventional full-wave, self-saturating circuit with two DC control windings. The magnetic amplifier includes a pair of saturable cores 46 and 48 provided, respectively, with load windings 50 and 52. These windings are connected across the secondary 32 of the transformer 30 and are connected to a common output resistor 54 back to the center tap of the winding 32 through a pair of diode rectifiers 56 and 58. A capacitor 55 is connected across the resistor 54. The cores 46 and 48 are linked by a conductor 60 forming a single-turn bias winding for the magnetic amplifier. The conductor 60 is connected in series with the power transistor 14 and carries the full-load current.

An additional bias winding is wound on each core, as indicated at 62 and 64 respectively. Windings 62 and 64 are connected in series across a source of DC potential. The potential source includes a resistor 66 and zener diode 68 connected in series with the transistor 26 across the 28-volt supply. The windings 62 and 64 are connected in series in a current path extending from the junction between the resistor 66 and zener diode 68 through a resistor 70 back to ground. The direction of current through the windings 62 and 64 is such as to oppose the direction of flux produced by the flow of current in the windings 50 and 52 and the flow of current through the conductor 60. A second source of voltage for controlling the bias windings 62 and 64 is derived across the load. To this end, a pair of resistors 72 and 74 in series connect the positive potential end of the series windings 62 and 64 back to the conductor 60. The resistors 70 and 72 act as summing resistors for summing the reference bias voltage at the zener diode 68 with the voltage derived across the load.

When the magnetic amplifier 44 is turned on, in a manner hereinafter described in detail, it turns on a shunt transistor 76 having its collector connected to the base of the transistor 14 and having its emitter connected back to the emitter of the transistor 14. The base of the shunt transistor 76 is connected through a series resistor 78 to the output of the magnetic amplifier 44 across the resistor 54. Thus, whenever the magnetic amplifier is turned on, the shunt transistor 76 is turned on, shunting current from the base of the transistor 14 and turning off the transistor 14.

Operation of the overload control circuit as thus far described may be best understood by reference to the graphical illustration of FIG. 3. This graph shows average current through the load as a function of the load resistance. Assuming that substantially all of the voltage drop of the source is across the load, the current through the load varies inversely with the resistance of the load as represented by the conventional exponential curve 80. At rated load $L_R$, the power controller operates at 100 percent of rated current $I_R$. As the load resistance decreases below rated value, the current drawn through the load continues to increase to some point above the rated current level, indicated at 82 in FIG. 3, which may be at 150 percent of rated current $I_R$. Without the current limiting control feature of the power controller, any further decrease in load resistance would result in the further increase in current, as indicated by the dotted line portion of the exponential curve 80. However, with the current limiting control circuit as described above, when the current through the conductor 60, linking the cores of the magnetic amplifier 44, reaches a predetermined level above the rated current level, the cores of the magnetic amplifier 44 alternately begin to reach saturation level during successive half cycles of the voltage applied to the amplifier. Thus, the magnetic amplifier turns on for a brief portion of each half cycle of the AC voltage derived from the transformer 30. When the amplifier is turned on sufficiently long during each half cycle to develop a voltage across capacitor 55 in excess of the base-to-emitter drop of the transistor 76, the transistor 76 turns on, turning off the power transistor 14. As a result, the load current through the bias winding of the magnetic amplifier provided by the conductor 60 is interrupted. This turns off the magnetic amplifier 44, turning off the transistor 76 and permitting the transistor 14 to be turned on.

As long as the peak current through the load and bias winding 60 exceeds the level at which the magnetic amplifier cores saturate, the power transistor is repeatedly turned off and on in the manner described. The time required to turn off the power transistor is less than a half cycle at the frequency of the oscillator 24 because of the low inductance of the bias winding 60. The time for the power transistor to turn on again is normally a half cycle later but may be longer. As the level of peak current increases, the sooner in each half cycle the cores reach saturation and the quicker the power transistor 14 is turned off. This tends to limit the average current even though the peak current increases with larger overloads.

As the load resistance approaches zero or a dead short, the assumption that all the voltage drop is across the load no longer applies. And more and more of the voltage drop will appear across the transistor 14 and resistor 22. As a result, as the short-circuit load condition is approached, the bias voltage derived across the load through the summing resistor 72 decreases, thus, decreasing the bias current through the windings 62 and 64. Since these bias windings oppose the action of the bias winding provided by the conductor 60, the cores of the magnetic amplifier 44 reach saturation earlier in each half cycle of the input voltage. The result is that with a dead short load, the average load current can be limited to a fraction of the rated load current. This effect is shown in the graph of FIG. 3 by the portion of the curve indicated at 84. It will be seen that at zero load resistance, corresponding to a dead short, the average load current is shown, by way of example, as being 75 percent of the rated current $I_R$, substantially below the maximum value of current indicated at 82 of the curve.

Characteristics of the magnetic amplifier 44 are such that some current may be produced at the output of the magnetic amplifier even when the magnetic amplifier does not saturate. Furthermore, with the power controller turned on but with an open circuit condition, no current is present in the bias winding conductor 60. On such condition, the magnetic amplifier tends to be turned on by the bias windings 62 and 64. To insure that the overload circuit is not activated under such conditions, an opposing voltage is added to the output of the magnetic amplifier 44 by means of a pair of diodes 88 and 90 connecting opposite ends of the secondary winding 32 through a common resistor 92 to the load resistor 54. The diodes are polarized so as to produce a negative voltage which is added to the output voltage produced by the magnetic amplifier 44. By this arrangement, the magnetic amplifier 44 must be turned on sufficiently by the overload current to the conductor 60 to more than offset the negative voltage developed by the diodes 88 and 90 across the resistor 92 before the transistor 76 is turned on.

In order to prevent the generation of R–F noise by the high-speed switching action of the power transistor 14, a time-delay circuit 94 is provided which slows down the rate at which the power transistor is turned on or turned off by the control transistor 26. The circuit 94 includes a transistor 96 having its emitter and collector connected to shunt the base-emitter circuit of the power transistor 14. The base of the transistor 96 is tied to the emitter through a resistor 98 so that the transistor 96 is normally biased off. A timing circuit including a resistor 100 and capacitor 102 in series couples the base to the emitter through a relatively large resistor 104. The timing circuit is also connected to ground. In operation, when the control circuit 28 turns on the oscillator 24 and a DC voltage is produced by the diodes 34 and 36, the transistor 96 is momentarily turned on as the capacitor 102 becomes charged up through the resistor 100. Transistor 96 bypasses current from the base of the power transistor 14. As the transistor 96 turns off, the power transistor 14 turns on. Thus, the rate at which the power transistor turns on is controlled by the time constant of the resistor 100 and capacitor 102, providing a "rollon" effect for the power transistor 14.

Similarly, a transistor 106 has its collector and emitter connected between the collector and the base of the power transistor 14. The base and emitter of transistor 106 are connected through a resistor 108, while the base of the transistor 106 is connected through a timing circuit, including a resistor 110 and capacitor 112 in series, connected between the base of the transistor 106 and ground. Transistor 106 is turned on when the DC voltage provided by the diode 34 and 36 is removed, thereby sustaining base current to the power transistor 14 until the capacitor 112 is discharged through the resistor 110 and the transistor 106 turns off. Thus, the transistor 106 provides a "rolloff" effect in turning off the power transistor 14.

Control circuit 28 is shown in more detail in FIG. 2. The control circuit is operated by a voltage level on an input line 116. This level may be derived from any low-level logic circuit, but is shown by way of example only as being derived from a mechanical switch 118 which connects the input 116 to ground in the OFF position and connects it to a +5 volt level in the ON position. This level is applied through a series resistor 120 directly to the base of the transistor 26 so that when the switch 118 is thrown to the ON position, the transistor 26 is turned on, energizing the oscillator 24 and thereby turning on the power transistor 14 in the manner described above.

One of the features of the present invention is that in the event of overload condition which persists, in addition to providing a current limiting mode of operation, the power controller circuit automatically turns off all power to the load after a predetermined period of time, for example, 2 seconds. This is accomplished by means of a second magnetic amplifier indicated generally at 124. See FIG. 1. The magnetic amplifier 124 is substantially identical to the magnetic amplifier 44 and is controlled by the power conductor 60 linking the two cores of the magnetic amplifier. The magnetic amplifier 124 is operated from a transformer 125 having a center-tapped secondary winding 126 and a primary winding 127 connected to the output of the oscillator 24. The cores of the magnetic amplifier are provided with bias control windings 128 and 130 connected in series with the bias control windings 62 and 64 of the magnetic amplifier 44. Thus, the magnetic amplifier 124 responds to an overload condition or a short-circuit load condition in exactly the same manner as the magnetic amplifier 44 described above.

The output from the magnetic amplifier 124 is derived across a load resistor 132 and charges up a capacitor 131 through a diode 133. The output voltage developed across the resistor 132, produced by the magnetic amplifier 124 when turned on by an overload condition, is applied to the control circuit 28 in the manner shown in FIG. 2. Thus, the output is applied through a series resistor 134 to the base of a transistor 136. The transistor 136 has a collector load resistor 138 connecting the emitter-collector circuit of the transistor 136 across a DC potential. The collector of the transistor 136 in turn is connected through a resistor 140 to the base of a transistor 142. The transistor 142 is part of a standard OR gate including a second parallel transistor 144. Transistor 142 is normally conductive because of base current provided through the resistor 138. Transistor 142 bypasses a timing circuit including a capacitor 146 and series resistor 148 connected across the DC potential source through a resistor 150.

The timing circuit is connected to the base of a transistor 152 through a zener diode 154 and current multiplying transistor stage 156. The gage and the emitter of the transistor 156 are connected to ground through resistors 178 and 160, respectively, while the collector is connected to the positive potential source through series resistors 162 and 164. The transistor 152 has its collector-emitter circuit connected in shunt across the input switch 118 so that when the transistor 152 is turned on, it effectively grounds the base of the transistor 26, turning off the oscillator 24. The transistor 152 is normally turned off by the fact that the transistor 156 is turned off and the base is held at ground potential through the resistor 160. When an output is derived from the magnetic amplifier 124, turning off the transistor 142, the capacitor 146 begins to charge up through the resistors 148 and 150. After a predetermined period of time, the voltage builds up across the capacitor 146 to the point at which the transistor 156 is turned on through the voltage dropping zener diode 154. This, in turn, causes the transistor 152 to be turned on and the transistor 26 to be turned off. Thus, the power transistor 14 is turned off in response to an overload condition.

In order to hold the power transistor off even through the magnetic amplifier 124 is turned off sufficiently long to permit the charge on capacitor 131 to leak off, a latching circuit is provided by a transistor 166 having its emitter and base connected across the resistor 162 and having its collector connected to the base of transistor 136. Normally the transistor 166 is turned off. However, when the transistor 156 is turned on, producing a voltage drop across the resistor 162, the transistor 166 is turned on. This maintains base current to the transistor 136 even through the magnetic amplifier 124 subsequently remains turned off.

The control circuit may be reset by a Reset button or other means for actuating a trigger circuit 168, the output of which is applied to the base of the transistor 144. Thus, the reset circuit turns on the transistor 144 discharging the capacitor 146 of the timing circuit and turning off the transistor 152. Assuming that the switch 118 is still at the ON position during the reset operation, the power transistor 14 would be again turned on. If the overload condition has been removed, operation of the power controller would then continue in a normal manner.

The reset operation can also be accomplished by merely turning off the switch 118. To this end, the switch 118 is connected to the base of the transistor 144 through an inverter 170. Thus, when the switch 118 is turned off, the transistor 144 is turned on causing the timing circuit to be discharged. Thus, when the switch 118 is again turned on, the control circuit is in a reset condition.

From the above description, it will be recognized that the power controller circuit of the present invention is capable of providing remote operation of a power circuit. The power controller can be operated from low-level logic and can be reset remotely by low-level logic. The power controller includes its own overload protection because the magnetic amplifier is controlled by a single-turn bias winding. It has substantially no inductance and can be turned on extremely rapidly, a small fraction of a cycle at the frequency of the oscillator 24. It should be noted that the "rolloff" circuit provided by the transistor 106 does not affect the turning off of the power transistor 14 by an overload condition. Under overload operation, the bypass transistor 76 is turned on, thereby diverting base current from the power transistor 14 and causing the power transistor to be turned abruptly off. This operation does not turn on the transistor 106 and, therefore, the "rolloff" circuit does not sustain conduction through the power transistor 14 as it does where the oscillator 24 is turned off.

What is claimed is:

1. A switching circuit for controlling power to a load from a source of electrical power comprising switching means connected in series with the load across the source, means for sensing the level of current through the load, means responsive to said current sensing means for operating the switching means to interrupt the current to the load when the current level exceeds some selected level, and means responsive to said current sensing means for operating the switching means to restore current to the load after the current has been interrupted for a predetermined time interval.

2. Apparatus as defined in claim 1, further including means for sensing the voltage drop across the load, and means controlled by said voltage sensing means for reducing the effective current level at which said means operating the switching means interrupts current to the load in response to a drop in voltage across the load.

3. Apparatus as defined in claim 1 wherein said means operating the switching means to interrupt the current to the load includes means for adjusting the time required for the switching means to interrupt the current to the load inversely in relation to the magnitude of the load current in excess of selected level.

4. Apparatus as defined in claim 1, wherein the current responsive means includes a magnetic amplifier having a first bias winding connected in series with the load.

5. Apparatus as defined in claim 2, wherein the current responsive means includes a magnetic amplifier having a first bias winding connected in series with the load.

6. Apparatus as defined in claim 1, wherein the switching means includes a power transistor having collector, emitter, and base electrodes, the collector and emitter electrodes being connected in series circuit with the load, and a source of base current connected to the base and emitter electrodes for turning on the power transistor, and further including first and second transistors, each having collector, emitter, and base electrodes, the first transistor having its collector electrode connected to the collector of the power transistor and its emitter electrode connected to the base of the power transistor, the second transistor having its emitter electrode connected to the base of the power transistor and having its collector connected to the emitter of the power transistor, a resistor connecting the base electrode to the emitter electrode of each of said first and second transistors, and a resistor and capacitor in series connecting the base electrode of each of said first and second transistors to a common reference potential.

7. A switching circuit for controlling power to a load from a source of electrical power comprising switching means connected in series with the load across the source, means for sensing the level of current through the load, means responsive to said current sensing means for operating the switching means to interrupt the current to the load when the current level exceeds some selected level, means for sensing the voltage drop across the load, and means controlled by said voltage sensing means for reducing the effective current level at which said means operating the switching means interrupts current to the load in response to a drop in voltage across the load, the current responsive means including a magnetic amplifier having a first bias winding connected in series with the load, the voltage sensing means including a second bias winding in the magnetic amplifier, the second bias winding being connected in shunt across the load.

8. Apparatus as defined in claim 7, further including a source of bias voltage connected across the second bias winding.

9. A power controller circuit for switching current to a load from a direct-current source, comprising a switch element connected in series with the load across the source, means responsive to an input control signal for selectively turning the switching element on and off, and means responsive to the level of current through the load when the switch unit is turned on for interrupting the current path to the load when the peak current exceeds a predetermined level, said last-named means including means responsive to the drop in current level to the load when the current path is interrupted for restoring the current path after a predetermined time whereby the current is interrupted and restored at recycling time intervals as long as the peak load current exceeds said level.

10. Apparatus as defined in claim 9, including a timing circuit, means responsive to the level of current to the load for actuating the timing circuit when the current level exceeds a predetermined level, and means responsive to the timing circuit after a set time interval for changing said input control signal means to turn off the switching element, the time interval of said timing circuit being longer than said recycling time interval of said current interrupting means.

11. Apparatus as defined in claim 9, wherein said current interrupting means includes a magnetic amplifier driven from an alternating-current source and having a bias winding connected in series with the load, the magnetic amplifier providing an output signal in response to a high level of current through the bias winding, and means for turning off the switching unit in response to said output signal from the magnetic amplifier output.

12. A power controller for directing power to a load from a direct-current source and limiting the average current to the load, comprising a power transistor having collector, base, and emitter electrodes, the power transistor having its collector and emitter electrodes, series connected with the load across the source, a magnetic amplifier circuit including a control winding connected in series with the load and power transistor, means responsive to the output of the magnetic amplifier for periodically turning the power transistor off and on to control the average current to the load when the peak current through the control winding reaches a predetermined level, a bias winding in the magnetic amplifier, means normally passing current through the bias winding in a direction to produce magnetic opposition to the field produced by the control winding, and means for decreasing the current through the bias winding with a decrease in voltage across the load.

13. Apparatus in claim 12, further including an alternating-current source, rectifier means coupled to said alternating-current source, the rectifier means being connected to the base of the power transistor, the magnetic amplifier being driven from said alternating-current source to provide a pulsed output from the amplifier at a rate determined by the frequency of the source.

14. Apparatus as defined in claim 13, further including a timing circuit, means responsive to the peak level of current flow through the load for turning on said timing circuit when the load current peaks exceed a predetermined level and turning off the timing circuit when the load current peaks drop below said level, and means controlled by the timing circuit for disabling the alternating-current source when the timing circuit has been on a preset time interval.

15. Apparatus as defined in claim 14, wherein said means for turning on the timing circuit includes a second magnetic amplifier driven from said alternating-current source, the second magnetic amplifier having a control winding in series with the load.

16. A power controller circuit for connecting a load to a DC power source comprising a power transistor having a collector, an emitter, and a base electrode, the load being connected in series with two of said electrodes across the said source, control means for biasing said transistor into saturation to pass current from the source to the load, means for sensing the level of current through the load, means responsive to the current-sensing means for controlling the power transistor to limit the average current through the load to a predetermined maximum overload level, a timing circuit, means responsive to said current level sensing means for activating said timing circuit when the average current exceeds a predetermined level, and means responsive to the timing circuit for biasing off the power transistor after the average current level has exceeded said predetermined level for a preset interval of time.